United States Patent [19]

Desmarais

[11] Patent Number: 4,913,680
[45] Date of Patent: Apr. 3, 1990

[54] LOW-TRELLIS MOBILE HOP PICKER

[76] Inventor: Donald A. Desmarais, P.O. Box 125, Mabton, Wash. 98935

[21] Appl. No.: 79,588

[22] Filed: Jul. 30, 1987

[51] Int. Cl.$^4$ .............................................. A01D 46/02
[52] U.S. Cl. ...................................... 460/129; 56/130; 56/330; 56/14.7; 180/140
[58] Field of Search ...................... 56/10.9, 11.9, 14.7, 56/16.5, 330, 328.1, 329, 130, 35, 16.6, 214; 130/30 P; 280/6 H, 263; 180/140, 24, 23, 41

[56] References Cited

U.S. PATENT DOCUMENTS

| | | | |
|---|---|---|---|
| 2,447,122 | 8/1948 | Horst | 56/130 |
| 3,594,995 | 7/1971 | Soules | 56/130 |
| 3,983,950 | 10/1976 | Fabian | 180/41 |
| 4,276,738 | 7/1981 | Ferraro | 56/330 |
| 4,279,118 | 7/1981 | Col et al. | 56/329 |

FOREIGN PATENT DOCUMENTS 1296038  3/1987  U.S.S.R. ................................ 56/130

Primary Examiner—John Weiss
Attorney, Agent, or Firm—Seed and Berry

[57] ABSTRACT

A mobile hop picking machine is provided with independently elevatable wheels. The picker straddles a trellis to position opposing picking cats on either side of the vines. Front and rear banks of picking hooks move upwardly to pick the hops. A bank of resilient raking tines comb the vines upwardly between the picking banks. The picking cats are pivoted about their front edges and are supported for transverse movement on their rear edges. Cylinders urge the rear of the cats toward the vines. A contact member connected to the cat moves the cat transversely, to avoid cat contact with poles, against a biased mounting provided for the hydraulic cylinder. Longitudinal conveyors transport the hops rearwardly and upwardly. A squeeze conveyor floats on a top support over the elevating end of the longitudinal conveyors. An alternate arrangement intersperses the raking tines and picking hooks.

16 Claims, 5 Drawing Sheets

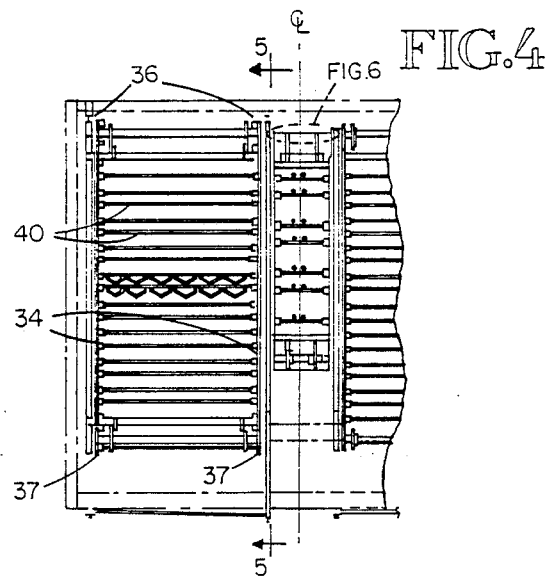
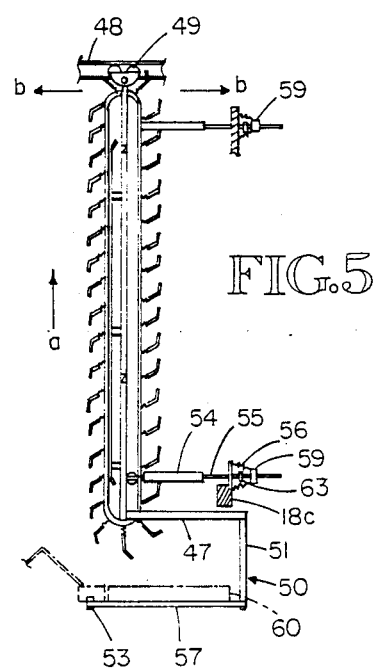
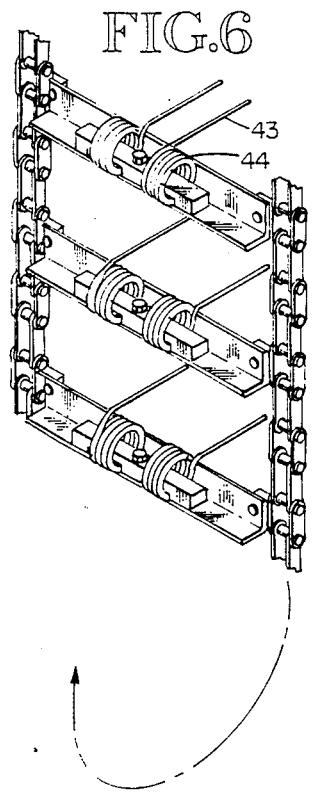
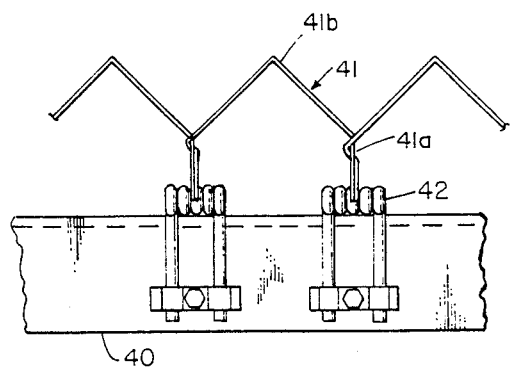

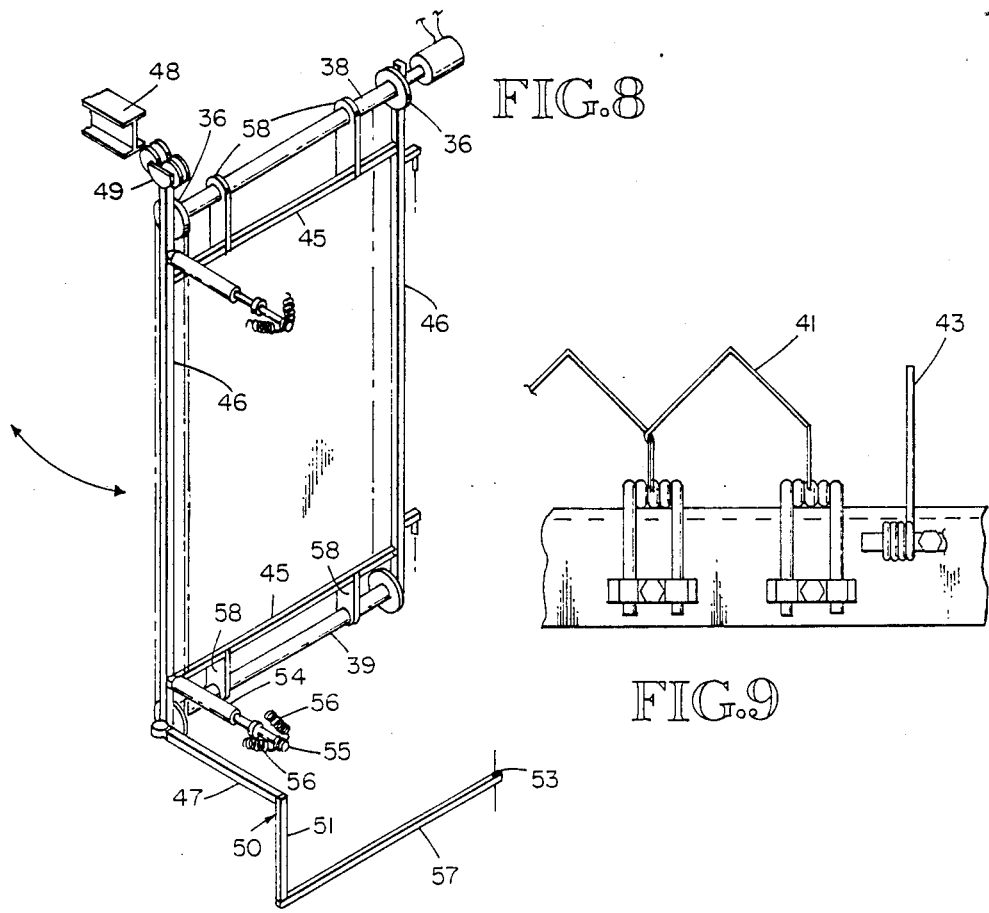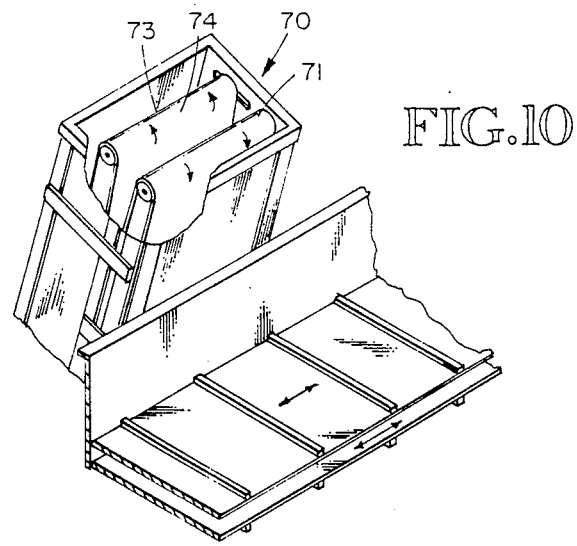

LOW-TRELLIS MOBILE HOP PICKER

DESCRIPTION

1. Technical Field

The present invention relates to machines for picking hops from trellised vines which remain attached to the hop crown and trellis. More particularly, the hop picker of the invention relates to a mobile hop picker that is capable of picking hops from rows of low-trellis hop plantings leaving the plant intact and leaving the trellis intact.

2. Background of the Invention

Conventionally, hop vines have been grown on tall trellis arrangements consisting of spaced vertical poles which support spaced horizontal tie wires. The wires are positioned on the order of 15–18 feet above the ground. The hop vines are supported on strings extending from the hop crown at ground level to the top wires.

Hops grown on such trellis arrangements were, in the past, picked by hand or by means of a stationary hop picking machine through which the vines, cut at the base from the hop crown, were fed after being transported to the machine. Later hop picking machines were developed which could be towed along the rows of hops, engaging the vines and pulling them from their supporting overhead wires. Such towed hop pickers are described by Horst in U.S. Pat. No. 2,447,122 and Siebol in U.S Pat. No. 3,527,036.

Hops are picked from the vines in many machines, including Horst and Siebol, by placing the vines into contact with at least one picking bank. A picking bank typically includes a pair of opposed, rotating conveyors each having surfaces that support a plurality of parallel bars upon which hop picking hooks are mounted. The hooks comb the hops from the vines.

Self-propelled pickers have been developed, an example of which is described by Soules in U.S. Pat. No. 3,594,995. The Soules picker includes two sets of hop picking banks similar to those described above. Soules also includes a mechanism for cutting and grasping the basal portion of the vine and a mechanism for cutting the vines free at the top supporting wire of the trellis. The picked hops are collected by horizontal conveyors that discharge into a conveyor section that pivots vertically for elevating and dumping the picked hops into transporting vehicles. A mechanism for coordinating the height of the picking hooks with the height of the vines is also provided.

More recently, hop pickers have been designed to pick hops from a low profile hop trellis, limited to a 2 meter height. The picking machine straddles and picks without cutting the vines at the base or cutting the vines from the supporting trellis. Such a machine is shown by Ferraro in U.S. Pat. No. 4,276,738. The Ferraro picker includes two sets of conventional picking banks. This machine is a modified grape harvestor. The grape vine shaker rods were replaced with picking banks. The picking banks may be moved transversely with respect to the machine and into contact with the vines growing on both sides of the trellis. A key feature of the Ferraro picker is that the picking hooks of the first set of picking banks move downwardly, while the picking hooks of the second set move upwardly. The picked hops fall downwardly onto two horizontal transport conveyers positioned below the picking carriages.

The prior art devices have left some problems unsolved. There is always variability in terrain or vertical misalignment of the trellis system. The prior art machines cannot be leveled to compensate for sloping terrain, for example. Since trellis posts are conventionally set in vertically, the picking banks of previous machines may strike the posts on sloped or uneven ground damaging the picking banks and/or trellis. If the posts are not vertical on level ground, or normal to a sloped surface, the picking banks may likewise strike the posts and be damaged or damage the trellis.

The dimensions of the hop plants vary in an irregular manner along the trellis as well as at different heights above the hop crown. Prior hop picking machines provided limited adaptability to the variations in thickness of the plants along the trellis.

Each hop cone includes some 15,000 lupulin glands containing the liquid resins and oils that are the essential contents of hops. Harvesting and handling which ruptures the lupulin gland membranes, exposes their essential contents to oxidation, resulting in an unacceptable product. A picking system that employs a downwardly directed picking action imparts velocity to the picked hop cones that causes significant damage to the picked product.

For optimum picking, the picking force is exerted to move the hop cone upward when the hop vine is in its natural position on a growing vine.

Prior hop picking machines have relatively poor picking effectiveness because many of the hop cones are covered by foliage during the picking process. The covering foliage prevents the cones from being picked.

Additionally, prior hop picking machines generally provide transport conveyors which elevate the picked cones to facilitate their discharge into a collecting receptacle. The elevating conveyors often permit the cones to tumble, which causes damage to the glands.

Conveyors on prior hop picking machines often included transport conveyors that attempted to transfer hops from a first conveyor to a second conveyor at right angles to the first. The light hop cones often piled up at the intersection of the two conveyors blocking the conveyors and spilling the hops.

DISCLOSURE OF THE INVENTION

It is an object of the invention to provide a mobile hop picking machine that is particularly suitable for picking hops from low vertical height trellis arrangements up to 3 meters or 10 feet for maximum yield. The hop picker of the invention is characterized by greater flexibility in the field than prior machines with respect to its ability to align its picking banks with the trellis supported hops and avoiding damage to the trellises, vines and hop picker.

It is a further object of the invention to provide a hop picking machine which avoids imparting velocity to the hop cones to avoid damage to the lupulin glands and that is characterized by providing an improved yield of hops from the vines by providing a number of raking tines in addition to hop picking fingers. The raking tines overcome the tendency of the vines to mat together, in response to initial contact with the picking fingers, and to limit hop recovery.

It is a further object of the invention to provide conveyor handling of the picked hops that avoids significant damage to the hops in collecting and elevating them for discharge from the machine. The hop cone, picked and delivered from the field by the hop picker of the invention is less likely to be crushed or otherwise damaged.

The hop picker machine of the invention includes a wheel-mounted frame that is designed and sized to straddle the trellis. An engine is mounted upon the frame and drives a hydraulic system that provides power to hydraulic drive motors on each wheel for propelling the picker along the trellis row. The hydraulic system also powers other parts of the hop picker. The hop picker includes two hop picking banks mounted upon the frame one behind the other. Each bank includes a pair of vertical picking cats, one positionable on each side of the straddled trellis. The picking cats are adjustably spaced from one another to accommodate the trellis and contact the straddled hop vines. Each picking cat includes upward-moving, centrally facing surfaces upon which are mounted a plurality of hop picking fingers that pull the hops from the vines. Also preferably included are a plurality of tines projecting from the surfaces of the cats or mounted on an intermediately positioned raking cat structure to rake and separate the vines during picking. The tines act to prevent matting of the vines in response to the action of the picking fingers, and improve overall recovery of the hops.

A pair of hop collecting conveyors are mounted upon the frame, each below and in alignment with the picking cat on the same side of the row. The collecting conveyors collect the hops as they fall downwardly after being picked and transport the collected hops rearwardly with respect to picker. A pair of elevating conveyors receive the hops from the collecting conveyors and elevate them substantially vertically for transfer from the hop picker via a horizontal conveyor, typically into a dumpster located in the adjacent row. Each elevating conveyor comprises a pair of closely spaced conveyors having flexible surface conveyor belts such that the hops are elevated while squeezed between the two conveyor belts in a manner that prevents tumbling and loss of lupulin gland content.

The hop picker of the invention includes two hydraulic systems designed to accommodate variations of the hop growing terrain that allow proper alignment of the picking banks into good picking contact with the hop vines.

First of all, the hop picker frame is adjustable vertically at each wheel by means of separately controllable hydraulic cylinders. Each wheel includes a wheel support upon which the wheel is rotationally mounted. A hydraulic cylinder interconnects the wheel support to the hop picker frame. In combination, the separately adjustable hydraulic wheel cylinders allow substantial vertical adjustment of the hop picking frame, and, thus, the picking banks, to permit adjustment for terrain or trellis orientation variations preferably of up to 3 meters.

The second system allowing adjustment of the hop picking banks with respect to the hop vines and trellis includes pivotably mounting the forward portion of each picking cat to the hop picker frame and connecting the rearward portion of said cats to the frame by means of hydraulic cylinders that provide transverse adjustment of picking surfaces into contact with the trellis supported hop vines. Preferably, the upper rearward portion of each picking cat is supported by a trolley fitted into a track supported on the frame for transverse adjustment.

The upper and lower rearward portions of each picking cat are adjustably connected to the hop picker frame by means of hydraulic cylinders attached to the picking cat and having a piston rod extending adjacent a hop picker frame member. The piston rod is attached to the frame member by springs. Actuation of the hydraulic cylinder causes the piston rod to adjust the picking cat transversely into contact with the hop vines. The springs hold the piston rod fixed with respect to the frame member except where the picking cat strikes a solid object, such as a trellis post, with sufficient force to overcome the resistance of springs interconnecting the piston rod and hop picker frame.

The hop picker of the invention is provided with hydraulic steering. Each front wheel includes a wheel support member upon which the wheel is mounted for rotation. Each support member includes pivot supports for rotating the wheels about a vertical axis. Complementary pivot supports are fixed to the picker frame and the wheel support member pivots are pinned thereto for rotation about the vertical axis. The forward wheel pair, pivoting in parallel alignment, provides steering for the hop picker. A hydraulic steering cylinder is fixed to the picker frame. The cylinder connects to a lever arm which extends from the wheel support member. Actuating the steering cylinder causes pivoting of the wheel about the vertical pivot within limits suitable for steering the picker. A steering wheel control assembly includes a manually operated steering wheel. The control hydraulically interconnects the pair of hydraulic steering arm cylinders and provides synchronized operation of the cylinders in response to steering wheel rotation. The machine further includes a cable of fixed length that interconnects the outer portion of the wheel support members. The cable passes through frame-mounted pulleys and insures that the wheels always remain in parallel alignment in response to steering control. A hydrostatic drive is provided which gives adjustable speed control preferably between 0 and 5 m.p.h.

BRIEF DESCRIPTION OF THE DRAWINGS

FIG. 4 is a partial sectional view taken along the center line of the hop picker machine showing a preferred hop picking cat and raking cat arrangement.

FIG. 5 is a partial front elevational view showing a preferred arrangement for adjusting the picking banks into picking contact with the hop vines.

FIG. 6 shows a partial, elevation view of a preferred central bank, shown in FIG. 4, that includes raking tines for dematting the hop vines during picking.

FIG. 7 is a schematic view of a conventional hop picking hook as utilized in the invention.

FIG. 8 is a schematic diagram of the picking cats and raking cats further illustrating the preferred arrangement for adjusting the picking banks into picking contact with the hop vines and avoiding damage resulting from the striking of a trellis support post.

FIG. 9 is an alternative embodiment of the picking cats which includes interspersed raking tines.

FIG. 10 is a partial view of the top of the elevating conveyors.

BEST MODE FOR CARRYING OUT THE INVENTION

Figure 1:
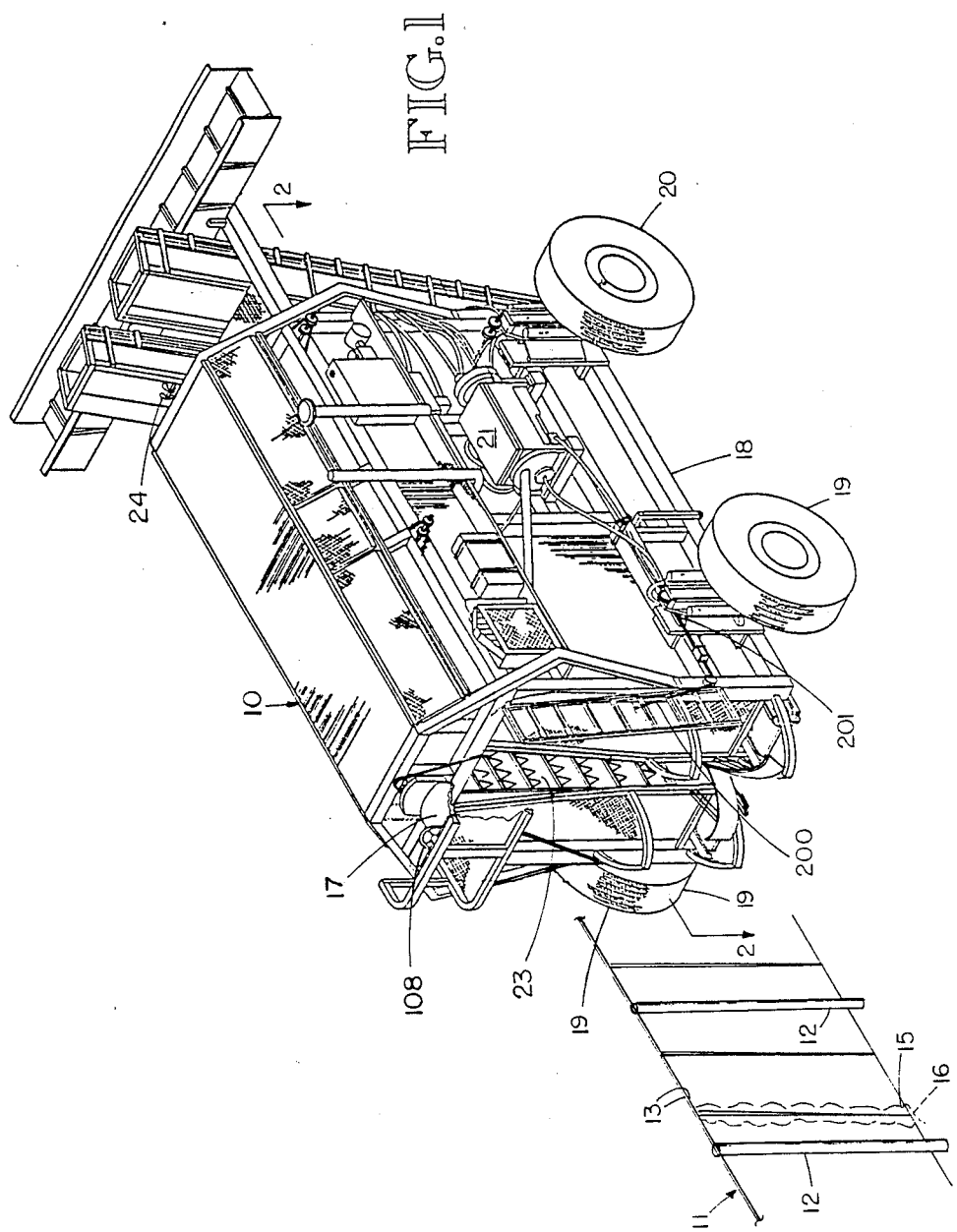
FIG. 1 is an isometric view of the hop picker of the invention showing the forward operator station and a portion of a typical low-profile trellis and hop vine.

Referring to FIG. 1, the hop picking machine 10 of the invention is shown adjacent a low-profile hop trellis 11. The trellis 11 consists of a row of vertically aligned poles 12 which support a pair of top horizontal wires 13 positioned about ten feet above the ground. A lower wire 14 extends between supports about nine inches above the ground. A number of intermediate tie strings (not shown) are attached between the lower wire and the top wires at spaced intervals, corresponding to hop plant spacing, for supporting the vines during their early stages of growth. The hop vines 15 are planted below the trellis and grow upwards on the trellis, forming a thick, bushy growth including, at maturity, hops on both sides of the trellis. Since the hop plant is a perennial, care must be taken to avoid damaging the plant crown during picking. The hop picker 10 requires no cutting of the vines and, after picking, the vines remain supported on the trellis.

The hop picker 10 includes a structural frame 18 upon which front wheels 19 and rear wheels 20 are mounted. A power system such as an internal combustion on engine-hydrostatic drive pump system 21 delivers hydraulic fluid under pressure to a hydraulic motor 22 (shown in FIGS. 11-13) mounted at and driving each wheel 19, 20. The hydraulic system 21 also powers all of the picking system components and certain other components of the machine 10 described below.

The hop picker frame 18 is provided with a longitudinal central opening 23 of such height and width that the machine 10 may be driven along the hop trellis 11 straddling the trellis and hop vines 15 without disturbing the crowns 16 of the vines on either side of the trellis or contacting the trellis or posts 12. The hop picking machine 10 includes an elevated, forward operating station 17 from which a machine operator steers the machine 10 along the hop rows 11.

Figure 2:
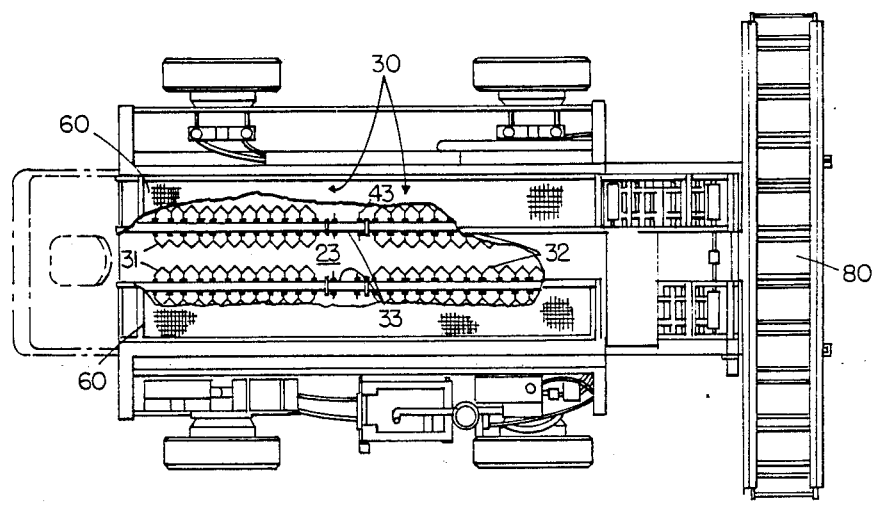
FIG. 2 is a section view, taken on line 2-2' from FIG. 1, with portions broken away showing the lower section of the machine to illustrate collecting conveyors and a preferred hop picking bank arrangement.
Figure 3:
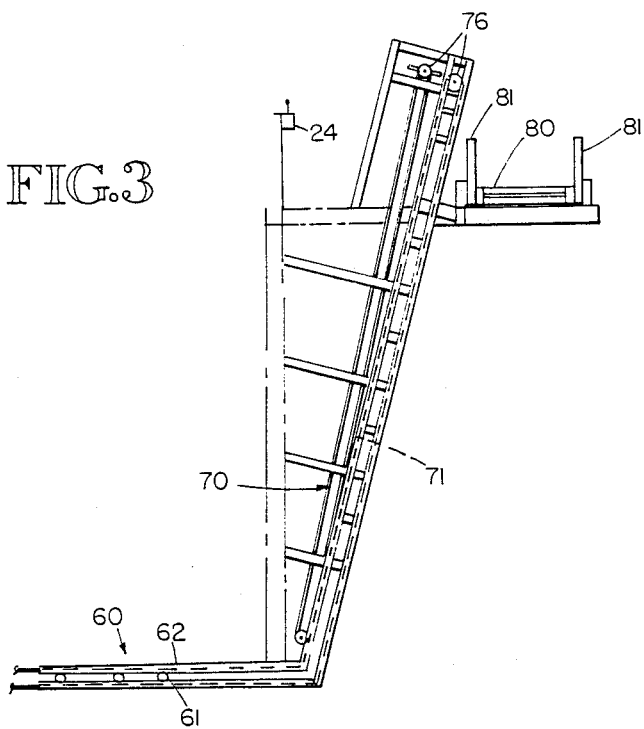
FIG. 3 is a schematic side elevation view showing the arrangement of the hop collecting and elevating conveyors.

As shown in FIGS. 2 and 4, the hop picker includes banks 30 of hop picking and vine raking cats. Each bank is comprised of pairs of vertically aligned picking cats spaced apart to accommodate the hop vine and trellis with each cat urged into contact with the hop vines 15 during picking operations. The cats are substantially self-adjusting with respect to the vines, as described below, and are designed to accommodate inadvertent contact with poles and other immovable objects. The picked hops travel over the top of the cats and drop downwardly onto collecting conveyors 60 and are transported to the rear of the machine where a pair of elevating conveyors 70 elevate and dump the hops onto a horizontal conveyor 80 for discharge into a dumpster for transporting the hops from the field.

Referring to FIGS. 2, 4 and 5, a preferred arrangement of hop picking and raking banks 30 is shown. The preferred arrangement includes two picking banks 31, 32. Each bank 31, 32 includes a pair of substantially vertical hop picking cats, spaced from one another transversely with respect to the machine to accommodate the hop vines and trellis between them. Each conveyor of the picking banks 31, 32 is transversely adjustable so that the bank may be placed into picking engagement with the hop vines 15. Each picking cat is supported on a horizontal frame member 18a and a vertical frame member 18b on each side of the hop row 11.

The picking banks 31 and 32 are formed of two pairs of juxtaposed picking cats. Each cat is formed by a pair of endless chains 34 which are mounted upon an upper sprocket pair 36 and a lower sprocket pair 37. The sprockets are fixed to a rotating drive shaft 38 and a rotatable idler shaft 39. Each pair of chains 34 is joined together by a plurality of aligned, transverse support bars 40. The bars are spaced approximately ten inches apart. Each bar 40 is fitted with a number of conventional hop picking fingers 41, as shown in FIG. 7, mounted upon springs 42. The picking fingers preferably are made of spring steel wire and include straight sections 41a about one inch in length spaced about three inches apart. The ends of the straight sections are joined by two converging straight sections 41b forming an apex about two inches from the outer end of the straight sections 41a. Preferably the straight sections of the hooks trail the base of the hooks with reference to the direction of travel of the hooks at an angle of approximately 30° from the normal to the surface of the cat. The tips of the hooks trail at an angle of about 80° from the normal to the surface of the cat. The picking fingers are intertwined with adjacent picking fingers. The vertical array of picking hooks 41 engage substantially the entire productive vertical height of the hop vine growing on the trellis.

The preferred bank arrangement also includes a raking bank 33, located between the two picking banks 31, 32. The raking bank is similar in general structure to the picking banks but is designed to aid and enhance the picking bank operation, as discussed below.

The center raking bank 33 includes a pair of raking cats that are similar in general structure to the picking cats. However, in place of picking fingers, a plurality of raking tines 43, as shown in FIG. 6, are arranged and spaced in longitudinal alignment along the conveyor cross bars 40. Preferably, there are two tines on each cross bar spaced about five inches apart. The raking tines 43 are preferably straight wires of spring steel that are mounted upon spring elements 44. The tines are preferably hay turning tines. The cross bars supporting the tines are preferably spaced 10 inches apart along the supporting chain. The tines extend sufficiently to engage and penetrate the hop vines. The tines are typically on the order of five inches in length. The tines function is to rake the vines to separate them and expose hops for picking that otherwise would not be accessible to the second bank of picking hooks.

In operation, all of the picking cats and the raking cats rotate with the surfaces adjacent the vines moving upwardly, as shown by arrows in FIG. 5, such that picking fingers engage the hops and separate them from the vines. The picking action of the conventional picking finger tends to cause the vines to mat together, reducing recovery of those hops that get covered by vine foliage and missed by the first picking bank. Thus, the central raking bank rakes the vines to separate the foliage and expose the hops remaining after the first bank has passed. The second bank of upwardly moving picking fingers then contacts the vines and removes the remaining hops. The combination of the picking fingers with the raking tines improves overall recovery with minimal damage of hops. The upward picking motion also tends to lessen damage to the picked hops since they fall onto the collecting conveyors only under the influence of gravity.

Each picking and raking cat is independently driven and provided with a substantially rectangular support frame, such as that shown in FIG. 4, which includes horizontal frame members 45 and vertical frame members 46. The horizontal frame members 45 support the idler shaft 39 and drive shafts 38 that carry the picking cat structure by means of bearings and bearing brackets 53. The raking cats are each preferably rigidly fixed to the associated rearward vertical frame member 46 in planar alignment with the associated picking cat of picking bank 31. The arrangement is such that the raking cats move transversely in concert with the picking cats of picking bank 31.

The picking cats of banks 31 and 33 are all suspended from the hop picker framework 18a by means of the rearward vertical members 46. As shown in FIG. 5, the upper, rear portion of the vertical frame 46 of each bank is suspended from a track member 48, mounted transversely with respect to the machine 10. A wheeled trolley 49, connected to the rearward frame member 46, rolls in the track member 48. Thus, the top rear of the picking cats are transversely adjustable to permit movement of the cats into contact with the hop vines.

The top front or lead portion of each picking cat is pivotally connected to the hop picker framework for movement about a vertical axis at the front of each picking cat.

A control arm 50 is provided for each cat in the picking banks 31 and 32, as shown in FIGS. 4 and 5, to control the engagement of each picking cat by allowing the rearward portion to adjust transversely into close contact with the hop vines to be picked under the influence of the hydraulic load cylinders, such as hydraulic cylinder 54. The arm extends around the horizontal hop conveyors, described below, which are positioned under the cats. The arm 50 includes a top horizontal arm 47 pivotally connected for rotation about a vertical axis to frame member 46. Arm 47 is rigidly connected to offset vertical member 51 extending downward. The lower end of arm 47 is pivotally connected, with a vertical axis of rotation, to a horizontal member 52. Horizontal member 52 is pivotally connected, with a vertical axis of rotation, to contact member 57. Contact member 57 extends forward to a point below and inboard of the front corner of the picking cat where it is pivotally connected with a vertical axis of rotation to the frame 18a by means of pin 53.

The upper and lower rearward corners of the picking cats are transversely adjustable by means of hydraulic cylinder systems interposed between the picking bank frames and the hop picking machine frame. A preferred adjusting system, shown in FIG. 5, includes pivotably connecting a hydraulic cylinder 54 between the picking cat frame 46 and the hop picker main frame member 18c. A biasing mechanism, such as a pair of springs 56 are connected between a collar 59 that is fixed to the piston rod element 55 and the main frame member 18c. A second collar mounted on the piston rod limits the extent to which the springs may be compressed. Preferably, there is an upper and lower cylinder/spring assembly connected to the rear edge of each picking cat. Activating the hydraulic cylinder extends the piston, swings the rear of the cat inward toward the hops, and urges the picking cat into contact with the hop vines on the trellis. Thus, in operation the rear portions of the picking cats in each picking bank are swung inward toward the opposite picking bank by operation of the hydraulic cylinder. This movement of the picking cats inward under the influence of the hydraulic cylinders causes the arms 47 and 51 to move transversely. In turn, this causes the rear end of contact member 57 to extend inwardly. If the contact member engages a post, the control arm 50 causes the rear of the associated picking cat to swing away from the post to avoid damage to the structure.

Referring to FIG. 2, collecting conveyors 60, substantially horizontally oriented, are provided on each side of the straddled hop trellis for collecting the hops as they fall downwardly from the picking banks 31, 32. Preferably, a pair of conventional, inwardly biased, flexible, closing flaps extend across the lower central opening to divert hop cones that fall downward onto the collecting conveyors. The flaps are of the type disclosed in U.S. Pat. No. 4,276,736, incorporated herein by reference. The conveyors are provided with a plurality of supporting rollers 61. In addition, each conveyor is provided with an endless flexible conveyor belt 62 turning about end rollers. The belt is driven such that the top surface of the belt moves rearwardly. The hops are caught on the upper surface of the belt 62 which transports them to the rear of the machine.

An elevating squeeze conveyor pair 70 receives hops collected from each of the two horizontal collecting conveyors 60 and elevates them for discharge from the hop picker. Each elevating conveyor includes a lower conveyor portion 71 (which is a continuation of the horizontal collecting conveyor) fitted with a smooth, flexible conveyor belting 72. The under surface of the top run of the conveyor belting is supported by a structure which limits deflection of the belting. The elevating conveyor 70 also includes a top squeeze conveyor 73 that includes a conveying surface 74 of smooth, flexible belting that is arranged sufficiently close to the conveyor belt 72 such that the collected hops are gently squeezed between the juxtaposed conveyor belts. The top squeeze belt runs on a head pulley and tail pulley and is unsupported between the pulleys so that the belting can flex. The spacing of the conveyors is preferably adjustable at the top and the bottom is allowed to float. The juxtaposed surfaces of the elevating conveyors are in contact at the lower end and adjustable from 2 to 5 inches at the upper end. The hops are squeezed between belts, but are not damaged in the elevating process, in contrast to the prior art. The conveyors are interconnected by means of a drive chain that is contacted with driving sprockets 76 whereby the juxtaposed surfaces of the conveyors rotate in the same direction at the same synchronized speed. This elevating conveyor 70, including the squeeze belt arrangement avoids tumbling of the hops, as occurs in a conventional bucket-type elevator or projecting flight conveyor arrangement and which results in damage to the hop lupulin gland. Damage may result in exposure of the essential contents of the gland to degradation by oxidation. The elevating conveyor 70 dumps the picked hops onto a transverse transfer conveyor 80 for transfer to a dumpster or transporting vehicle for removal from the field. The transfer conveyor includes side boards 81 providing a convenient holding capacity, permitting intermittent discharge, if desired.

Figure 11:
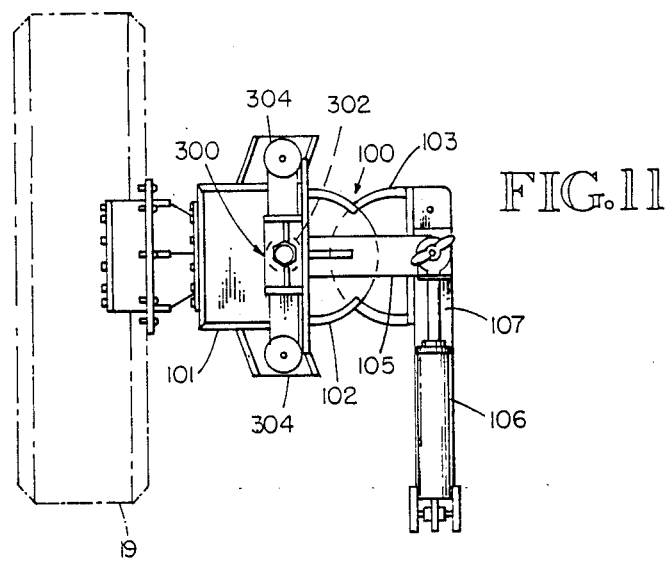
FIG. 11 is a partial, top plan view showing the front wheels of the hop picker including a portion of the hydraulic steering system.
Figure 12:
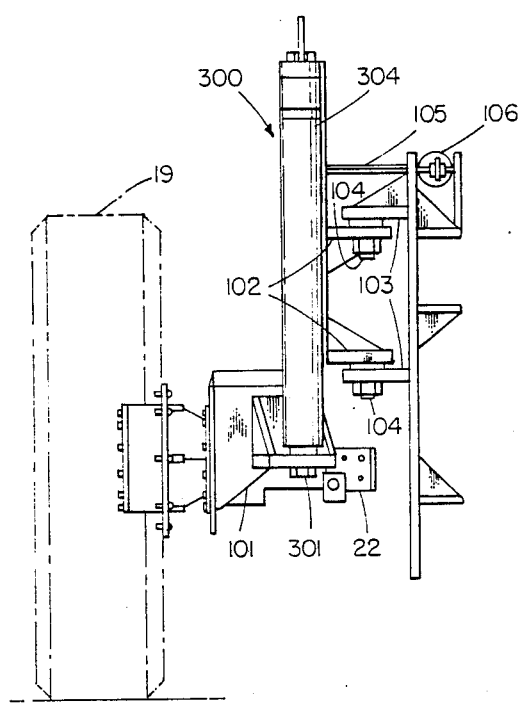
FIG. 12 is a partial, front elevation view showing the hydraulic steering system of the invention.
Figure 13:
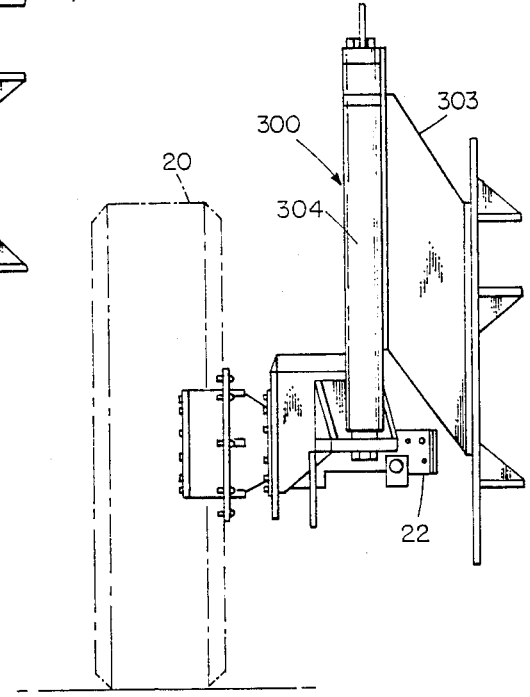
FIG. 13 is a partial, front elevation view showing a rear wheel assembly including the hydraulic cylinders interconnecting the wheel support members and hop picker frame.

Referring to FIGS. 1, 11 and 12, the hydraulic steering capability of the hop picking machine of the invention is depicted. The hydraulic steering system allows the operator to maneuver the hop picker along the straddled hop trellis. Each of the front wheels 19 of the picker are provided with a hydraulic steering control system. Each wheel includes a wheel support member 101 upon which a wheel 19 is rotatably mounted and a pair of supporting pivots 102 is fixed. A longitudinal frame member 18e adjacent to the front wheel is provided with a pair of pivoting supports 103 that are complimentary to the wheel support pivots 102. The two pivot supports 102 and 103 are provided with a pin fastener 104 such that the wheel support member 101 and the wheel 19 pivot about a vertical axis centered on pins 104. The wheel support member 101 includes a lever arm 105 that is fixed thereto and projects therefrom substantially perpendicularly, and adjacent to the longitudinal hop picker frame member 18e when the wheels are aligned with the frame member. A hydraulic cylinder 106 is connected to the frame member and includes a piston rod 107 element that is pivotably connected to the wheel support lever arm 105. Actuation of the hydraulic cylinder 106 in positioning the piston rod 107 results in positioning the wheel 19. The hydraulic cylinders 106 on each wheel are interconnected through a manual steering wheel 108 and hydraulic controls to cooperate to provide a steering response to the wheels in response to an operator turning the manual steering wheel 108. To insure that the wheels always act in synchronization and remain parallel to one another during steering, a fixed length cable 200, shown in FIG. 1, is connected at each end to an outer surface 201 of each wheel support member. The mechanical tie prevents the steering wheels from loosing their alignment.

Referring to FIGS. 10 and 11, each wheel 19, 20 is provided with a hydraulic cylinder 300 that permits vertical adjustment of the frame 18 with respect to the ground whereby the operator may orient the machine and the hop picking banks to accommodate the alignment of the trellis or the vines with respect to the ground. As noted above, each wheel includes a wheel support member 101 upon which it is mounted and fixed to the machine frame 18. Hydraulic cylinder 300 includes a piston element 301 connected to the support member 101. The cylinder housing portion 302 of the hydraulic cylinder 300 is fixed by means of the pivots 102, 103 and pins 104 on the front wheel or a pair of fixed brackets 303 on the rear wheel to the frame 18 of the hop picker. Actuating any one of the hydraulic cylinders 300 causes a change in elevation of the associated portion of frame 18 with respect to the ground. A pair of guiding supports 304 are provided to guide and support the hydraulic piston 301 during elevation of the frame. An operating station (not shown in detail) is provided with controls that permit independent adjustment of each one of the cylinders 300 so that the machine may be tilted in substantially any direction from the vertical to align the picking banks with the hop trellis and vine independently of the configuration of the terrain or variation of the hop trellis system from the vertical.

As an alternative to the picking bank arrangement shown in FIG. 4, the central raking bank may be eliminated by including the raking tine elements on the individual picking cats. In such an arrangement, the raking tines are interspersed amongst the picking hooks as necessary to achieve efficient removal of the hops by the hooks and the vine-separating action of the raking tines necessary to achieve the enhanced picking efficiency of the present invention. See FIG. 9.

In use, the machine is controlled by one operator who steers the machine and controls the speed from the front operator's station 17. A second operator, working at the rear operating station 24 controls the other operation, such as picking cat positioning, conveyor operation, and levels the machine.

From the foregoing, it will be appreciated that, although embodiments of the invention have been described herein for purposes of illustration, various modifications may be made without deviating from the spirit and scope of the invention. Accordingly, the invention is not limited except as by the appended claims.

I claim:

1. A machine for picking hops from vines growing in a row on a relatively short trellis, said trellis rows including vertical posts and joining horizontal wires for supporting the hop vines growing upwardly on both sides of said trellis, said hop picker machine, comprising:
    a wheel-mounted frame that straddles a portion of a hop vine trellis row;
    an engine mounted upon said frame for propelling said picker along said trellis row and operating said hop picker;
    a hop picking bank mounted upon said frame, said picking bank comprising a pair of substantial vertically oriented conveyors adjustably spaced from one another to accommodate said trellis and contact hop vines straddled by said frame, each picking bank conveyor including upwardly moving surfaces upon which are fixed a plurality of hop picking hooks that pull hops from the vines and a plurality of tines projecting from said surfaces to rake and separate the vines to prevent matting of the vines during picking;
    a pair of hop collecting conveyors mounted upon said frame, each below and in alignment with a picking conveyor, said collecting conveyors collecting hops as they fall downwardly after being picked, said conveyors transporting the collected hops rearwardly with respect to said hop picker; and
    a pair of elevating conveyors that receive the hops from the collecting conveyors and elevate them substantially vertically for transfer from said hop picker.

2. The hop picker machine of claim 1 wherein sad engine generates hydraulic pressure that operates a hydraulic drive motor mounted upon each wheel that propels said hop picker.

3. The hop picker machine of claim 1 wherein said engine generates a hydraulic pressure that operates a hydraulic steering system for said hop picker from an elevated operating station.

4. The hop picker machine of claim 3 wherein said hydraulic steering system comprises:
    wheel support members upon which each forward wheel is rotationally mounted, each said support member including pivot means for rotating about a vertical axis;

pivot supports fixed to said trellis straddling frame to which said wheel support member means are pinned for rotation about said vertical axis such that said forward wheel pair, pivoting in parallel alignment, permits steering of said hop picker;

a hydraulic steering arm cylinder for each forward wheel fixed to and aligned with a longitudinal frame member, said cylinder including a piston extending adjacent to, but transversely spaced from, said frame member;

a hydraulic steering arm for each forward wheel fixed to and extending substantially perpendicularly from said wheel support member adjacent to and pivotally pinned to said steering arm cylinder piston such that actuating said steering arm cylinder causes said piston to change position, moving said steering arm and pivoting said wheel about said vertical pivot within limits suitable for steering said picker; and a steering wheel control assembly, including a manually operated steering wheel, said control assembly hydraulically interconnecting said hydraulic steering arm cylinders and providing synchronized operation of the cylinder arms in response to steering wheel rotation.

5. The hop picker machine of claim 4 wherein said machine steering system further includes a cable of a fixed length that interconnects the outer portion of said wheel support members, said cable passing through frame-mounted pulleys, such that the wheels always remain in parallel alignment, in response to steering wheel rotation.

6. The hop picker machine of claim 1 wherein said hop picker frame is adjustable vertically at each wheel, providing overall adjustment of said picking bank into parallel alignment with said hop vines independently of ground configuration or hop trellis orientation with respect to said ground, said wheel-mounted frame including an individually adjustable hydraulic cylinder interposed between said wheel and said hop picker frame at each wheel.

7. The hop picker machine of claim 6 wherein the hop picker frame is hydraulically adjustable vertically at each wheel, each wheel including a wheel support member upon which said wheel is rotationally mounted, a hydraulic cylinder interconnecting said wheel support member and said hop picker frame, whereby actuating each said hydraulic cylinder causes said hop picker frame to change elevation with respect to said wheel and ground level, said hop picker further including controls for actuating individually each of said hydraulic cylinders such that the picking banks may be oriented in parallel contact with said hop vines.

8. The hop picker machine of claim 1 wherein said hop picker includes two picking banks upon which a plurality of picking hooks are mounted upon for upwardly advancement and a raking bank comprising a pair of vertical conveyors aligned with and between said picking banks, said raking conveyors including surfaces upon which a plurality of substantially single wire tines are mounted for upwardly advancement such that, after said first picking bank picks hops from said vines, such tines rake and separate the matted vines providing picking access for the second picking bank to hops remaining on said vines.

9. The hop picker machine of claim 1 wherein each picking bank conveyor includes a forward portion pivotably mounted upon said frame to pivot about a vertical axis and a rearward portion that is adjustable traversely with respect to said machine such that, for a pair of picking bank conveyors, the forward portions of the pair are fixedly spaced one from the other at a distance greater than the maximum expected width of said trellis and hop vines and the rearward portion of the banks may be pivotably adjustable into picking contact with said hop vines, accommodating various thicknesses of growth.

10. The hop picker machine of claim 1 wherein the upper rearward portion of each picking bank conveyor is supported from said hop picker frame by a trolley and track means for transverse adjustment of said picking banks.

11. The hop picker machine of claim 1 wherein the rearward portion of each picking bank conveyor is adjustably connected to the hop picker frame, including a hydraulic cylinder attached to said picking bank having a piston rod extending adjacent a hop picker frame ember, said piston rod attached to said frame member by an interconnecting spring such that actuation of said hydraulic cylinder causes said piston rod to adjust the picking bank conveyor transversely into contact with said trellis supported hop vines, said spring holding said piston rod fixed with respect to said frame member except where the picking bank conveyor strikes a solid object with sufficient force to overcome the spring interconnecting the piston rod and the hop picker frame member.

12. The hop picker machine of claim 11 wherein both the upper and lower rearward portions of said picking bank conveyors are transversely adjustable by said hydraulic cylinders.

13. The hop picker machine of claim 11 wherein the forward portion of each hop picking bank conveyor is pivoted about a vertical axis by a pin connection to said hop picker frame member.

14. The hop picker machine of claim 1 wherein said collecting and elevating conveyors are provided with substantially solid endless conveyor belts for supporting said hops.

15. The hop picker machine of claim 1 wherein said elevating conveyor includes a first endless belt that supports the vertical elevation of said hops and a second endless vertical conveyor belt closely adjacent said first conveyor belt such that said hops are squeezed between said belts during elevation.

16. The hop picker machine of claim 1 wherein said elevating conveyors, with the hops squeezed therebetween, release the elevated hops onto a intermittently operating horizontal conveyor which discharges the picked hops therefrom into a transporting container.

* * * * *